United States Patent Office 3,644,339
Patented Feb. 22, 1972

3,644,339
PROCESS FOR THE PRODUCTION OF
BENZODIAZEPINE DERIVATIVES
Toru Masuda, Nishinomiya, Yoshiro Usui, Ibaraki, Yukio
Hara, Kawanishi, and Toshikatsu Komatsu, Nishino-
miya, Japan, assignors to Takeda Chemical Industries,
Ltd., Osaka, Japan
No Drawing. Filed July 14, 1969, Ser. No. 841,611
Claims priority, application Japan, July 17, 1968,
43/50,306
Int. Cl. C07d 53/06
U.S. Cl. 260—239.3    6 Claims

ABSTRACT OF THE DISCLOSURE

Process for producing benzodiazepine compounds of the formula

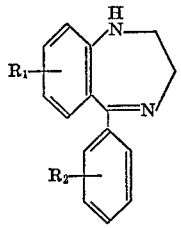

in which $R_1$ and $R_2$ are hydrogen, halogen or nitro, which involves reacting an anthranyl compound of the formula

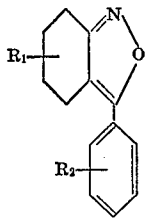

(1)

wherein $R_1$ and $R_2$ have the significances above with (2) an acid salt of glycine ester, said reaction being carried in the presence of an organic base under heating. The finally produced benzodiazepine compounds have excellent pharmacological properties and may specifically be used as sedative agents.

A process for the production of benzodiazepine derivatives.

This invention relates to a novel and useful process for producing benzodiazepine derivatives of the general formula

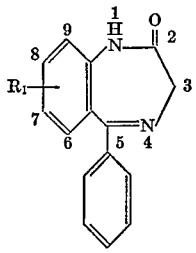

(I)

wherein $R_1$ is a member selected from the group consisting of hydrogen, halogen and nitro, starting from an anthranyl derivative of the general formula

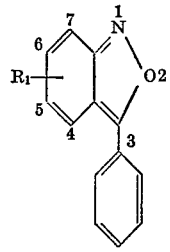

(II)

wherein $R_1$ has the same meaning as defined above.

It has been well known that the compounds of the general Formula I have a sedative or taming effect and other useful pharmacological effects. As the methods for the production of these benzodiazepine derivatives (I), the following have been known:

(A) A process which comprises reacting an aminobenzophenone derivative of the general formula

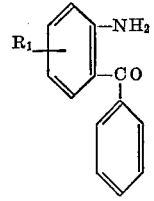

(III)

wherein $R_1$ has the same meaning as defined above, with a glycine ester.

(B) A process which comprises reacting (1) an aminobenzophenone derivative (III) with a halogenoacetylhalogenide, (2) allowing the resulting halogenoacetylaminobenzophenone derivative to react with ammonia and (3) subjecting the resultant to a ring-closure reaction.

These known processes require the use of an aminobenzophenone derivative (III) as the starting material. For the production of aminobenzophenone derivatives (III), the following step is required, namely, an anthranyl derivative of the above-mentioned general Formula II is subjected to a catalytic reduction by using a reducing catalyst and hydrogen under elevated pressure for a rather long period of time. However, the catalytic reduction step is not desirable when the production is conducted in an industrial scale, since the catalytic reduction step necessarily requires rather expensive reducing catalysts, and a large amount of hydrogen gas, and moreover the reduction must be conducted for a long period of time, while keeping the reaction system at an elevated pressure, which makes it unavoidable to use a series of steady and complicatedly-constructed apparatus and/or plants.

Furthermore, aminobenzophenone derivatives of the Formula III wherein $R_1$ is $NO_2$ group cannot be produced by the catalytic reduction of an anthranyl derivative of the Formula II wherein R is $NO_2$, since, upon the reaction, reduction of the nitro group per se is unavoidable. Thus, the aminobenzophenone derivative (III) wherein $R_1$ is $NO_2$ must be produced through many steps, i.e. (1) nitrating o-chlorobenzoic acid, (2) chlorinating the resulting 2-chloro-5-nitrobenzoic acid with thionyl chloride, (3) subjecting the resulting 2-chloro-5-nitrobenozylchloride to Friedel-Craft reaction with benzene and (4) finally aminating the resulting 2-chlor-5-nitrobenzophenone. It goes without saying that the method requiring such many steps as above is undesirable from an industrial point of view.

As seen from the foregoing the known processes for the production of the compound of the Formula I are not advantageous from an industrial point of view.

Under such circumstances, for the purpose of providing a method for producing the benzodiazepine derivatives (I) advantageously from an industrial point of view, the present inventors have made extensive studies to reach the unexpjected finding that anthranyl derivatives of the Formula II can be directly in one step converted into benzodiazepine derivatives of the Formula I by heating the anthranyl derivatives with an acid salt of a glycine ester in the presence of an organic base.

The principal object of the present invention is to provide a process for producing benzodiazepine derivatives (I) starting from anthranyl derivatives (II).

According to the present method, the object compound can be produced only in one step starting from an anthranyl derivative by a simple procedure without once converting the anthranyl derivative into the corresponding aminobenzophenone derivative, and therefore the present method is very advantageous from an industrial point of view.

The object of the present invention is realized by reacting an acid salt of glycine ester with the anthranyl derivative (II) under heating in the presence of an organic base.

Referring to the aforementioned formulas, $R_1$ may be attached to any optional position of the benzene ring. Halogen represented by $R_1$ is exemplified by chlorine, bromine, iodine, etc.

Additionally, the present reaction can proceed also in a case of using as a starting material such compounds as represented by the above general Formula II wherein R is other groups (e.g. trifluoromethyl and alkyl such as methyl, ethyl, propyl and isopropyl) than those defined before and/or a substituent attaches to the benzene ring of the 3-position of the anthranyl structure, the substituent being exemplified by nitro, halogen (e.g. chlorine, bromine, iodine, etc.), trifluoromethyl and alkyl (e.g. methyl, ethyl, propyl, isopropyl, etc.).

The acid which forms the acid salt of glycine ester of the starting material, may be inorganic acid or organic acid. The inorganic acid is exemplified by hydrochloric acid, sulfuric acid, hydrobromic acid and phosphoric acid. The organic acid is exemplified by aliphatic monocarboxylic acid (e.g. formic acid, acetic acid, propionic acid, etc.), aliphatic dibasic carboxylic acid (e.g. oxalic acid, succinic acid, malonic acid, etc.), sulfonic acid (e.g. benzenesulfonic acid, toluenesulfonic acid, etc.) and aromatic carboxylic acid (e.g. benzoic acid). As those acid salts of glycine esters, inorganic acid salts are preferable and among them, hydrochloric acid salt is most desirable. The glycine ester which forms the salt with the above-mentioned acid may be hydrocarbon esters of glycine, the hydrocarbon having 1 to 8 carbon atoms, such as alkyl esters, the alkyl having 1 to 6 carbon atoms (e.g. methyl, ethyl, propyl, butyl, pentyl, hexyl, etc.), aryl ester (e.g. phenyl ester) and aralkyl esters (e.g. benzyl ester, phenethyl ester, etc.) of glycine.

As the glycine esters, lower alkyl ($C_1$ to $C_6$) esters of glycine are desirable, and practically, ethyl ester of glycine is put into use.

Additionally, the present reaction can proceed also in a case of using an acid salt of glycine or an acid salt of other α-amino-acid ester than the glycine ester, instead of using an acid salt of the glycine ester. Other α-amino acid esters than glycine ester may be those represented by the formula

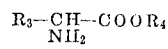

wherein $R_4$ is a hydrocarbon residue and $R_3$ may be carboxyl, alkoxycarbonyl (e.g. methoxycarbonyl, ethoxycarbonyl, etc.) carbamoyl, substituted carbamoyl (e.g. mono- or di-methylcarbamoyl, mono- or di-ethylcarbamoyl, mono- or di-acetylcarbamoyl, etc.), aryl (e.g. phenyl), aralkyl (e.g. benzyl) and alkyl (e.g. methyl, ethyl, propyl, etc.) having or not having substituents(s) such as alkoxy (e.g. methoxy, ethoxy, etc.), alkylthio (e.g. methylthio, ethylthio, etc.), substituted amino (e.g. mono- or di-methylamine, mono- or di-ethylamine, mono- or di-propylamine, etc.) and heterocyclic (e.g. piperidino, piperazino, pyrrolidino, morpholino, etc.).

In this case, the reaction gives the product of the formula

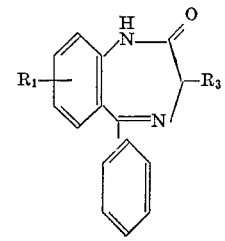

($R_1$ is the same meaning as in the Formula I and $R_3$ is the same meaning as above).

As the organic base to be employed in the present method, tertiary amines are desirable. The tertiary amines employable include, for instance, cyclic amines (e.g. pyridine, picoline, quinoline, collidine, N-methylpiperidine, N-ethylpiperidine, N-propylpiperidine, imidazole, 2-methylimidazole, 2-ethylimidazole, 2-propylimidazole, 1,2,4-triazole, N,N'-dimethyl piperazine, N,N'-diethyl piperazine, N-methylpyrrolidine, N-ethyl pyrrolidine, N-methyl morpholine, N-ethyl morpholine, etc.), aliphatic amines (e.g. trimethylamine, tributylamine, triethylamine, N-methyl cyclohexylamine, etc.), and aromatic amine (e.g. dimethylaniline, diethylaniline, dipropylaniline, etc.). Among the tertiary amines use is advantageously made of those having a boiling point of not lower than about 100° C. or those having a melting point of about 100° C. to about 150° C.

As such desirable amines, the following may be mentioned: pyridine, methylimidazole and 2-methylimidazole, as cyclic ones, tributylamine as an aliphatic one and dimethylaniline as an aromatic one. An organic base to be employed in the process of the present invention is generally not less than about one mole, practically about one to about 10 moles, and preferably about 4 to about 6 moles, relative to one mole of the starting anthranyl derivative (II). Amount of the acid salt of glycine ester is generally about 1 to about 5 moles, preferably about 3 to about 5 moles relative to one mole of the starting anthranyl derivative (II).

The reaction of the present invention is conducted under heating. The heating temperature is not lower than about 100° C., preferably about 100° C. to about 150° C., and more desirably about 120° C. to about 130° C.

The organic base employed can take a role as a reaction solvent so far as it is liquid. In such a case, the reaction proceeds in a solution or suspension phase, otherwise the reaction may proceed in a fused phase. But, if necessary, any other suitable solvent inert to the reaction such as, toluene, xylene, etc. may be concomitantly used with the organic base.

Upon carrying out the reaction, an acid may be added to the reaction system together with the organic base. The acid may be those mentioned before as forming a salt with a glycine ester. But, this acid may not necessarily be the same acid as that constituting the acid salt of glycine. An amount of the acid is generally about 1 to about 10 moles, preferably around 5 moles relative to the starting anthranyl derivatives (II).

The benzodiazepine derivatives (I) thus produced can be easily isolated by per se known manner in a form of the free base or a suitable acid salt thereof.

For example, extraction of the resulting reaction mixture with a suitable solvent, followed by the distillation of the solvent is one of the most convenient methods for isolating benzodiazepine derivative (I).

Typical benzodiazepine derivative produced by the process of the present invention are exemplified as follows:

(1) 5-phenyl-1,3-dihydro-2H-1,4-benzodiazepin-2-one.
(2) 6-chloro-5-phenyl-1,3-dihydro-2H-1,4-benzodiazepin-2-one.
(3) 7-chloro-5-phenyl-1,3-dihydro-2H-1,4-benzodiazepin-2-one.
(4) 8-chloro-5-phenyl-1,3-dihydro-2H-1,4-benzodiazepin-2-one.
(5) 9-chloro-5-phenyl-1,3-dihydro-2H-1,4-benzodiazepin-2-one.
(6) 6-bromo-5-phenyl-1,3-dihydro-2H-1,4-benzodiazepin-2-one.
(7) 7-bromo-5-phenyl-1,3-dihydro-2H-1,4-benzodiazepin-2-one.
(8) 8-bromo-5-phenyl-1,3-dihydro-2H-1,4-benzodiazepin-2-one.
(9) 9-bromo-5-phenyl-1,3-dihydro-2H-1,4-benzodiazepin-2-one.
(10) 6-nitro-5-phenyl-1,3-dihydro-2H-1,4-benzodiazepin-2-one.
(11) 7-nitro-5-phenyl-1,3-dihydro-2H-1,4-benzodiazepin-2-one.
(12) 8-nitro-5-phenyl-1,3-dihydro-2H-1,4-benzodiazepin-2-one.
(13) 9-nitro-5-phenyl-1,3-dihydro-2H-1,4-benzodiazepin-2-one.
(14) 6-trifluoromethyl-5-phenyl-1,3-dihydro-2H-1,4-benzodiazepin-2-one.
(15) 7-trifluoromethyl-5-phenyl-1,3-dihydro-2H-1,4-benzodiazepin-2-one.
(16) 8-trifluoromethyl-5-phenyl-1,3-dihydro-2H-1,4-benzodiazepin-2-one.
(17) 9-trifluoromethyl-5-phenyl-1,3-dihydro-2H-1,4-benzodiazepin-2-one.
(18) 6-methyl-5-phenyl-1,3-dihydro-2H-1,4-benzodiazepin-2-one.
(19) 7-methyl-5-phenyl-1,3-dihydro-2H-1,4-benzodiazepin-2-one.
(20) 8-methyl-5-phenyl-1,3-dihydro-2H-1,4-benzodiazepin-2-one.
(21) 9-methyl-5-phenyl-1,3-dihydro-2H-1,4-benzodiazepin-2-one.
(22) 6-ethyl-5-phenyl-1,3-dihydro-2H-1,4-benzodiazepin-2-one.
(23) 7-ethyl-5-phenyl-1,3-dihydro-2H-1,4-benzodiazepin-2-one.
(24) 8-ethyl-5-phenyl-1,3-dihydro-2H-1,4-benzodiazepin-2-one.
(25) 9-ethyl-5-phenyl-1,3-dihydro-2H-1,4-benzodiazepin-2-one.
(26) 6-propyl-5-phenyl-1,3-dihydro-2H-1,4-benzodiazepin-2-one.
(27) 7-propyl-5-phenyl-1,3-dihydro-2H-1,4-benzodiazepin-2-one.
(28) 8-propyl-5-phenyl-1,3-dihydro-2H-1,4-benzodiazepin-2-one.
(29) 9-propyl-5-phenyl-1,3-dihydro-2H-1,4-benzodiazepin-2-one.
(30) 5-p-chlorophenyl-1,3-dihydro-2H-1,4-benzodiazepin-2-one.
(31) 5-m-chlorophenyl-1,3-dihydro-2H-1,4-benzodiazepin-2-one.
(32) 5-o-chlorophenyl-1,3-dihydro-2H-1,4-benzodiazepin-2-one.
(33) 5-p-nitrophenyl-1,3-dihydro-2H-1,4-benzodiazepin-2-one.
(34) 5-p-trifluoromethyl-1,3-dihydro-2H-1,4-benzodiazepin-2-one.
(35) 5-p-methylphenyl-1,3-dihydro-2H-1,4-benzodiazepin-2-one.
(36) 5-p-ethylphenyl-1,3-dihydro-2H-1,4-benzodiazepin-2-one.
(37) 7-chloro-5-p-chlorophenyl-1,3-dihydro-2H-1,4-benzodiazepin-2-one.
(38) 7-nitro-5-p-chlorophenyl-1,3-dihydro-2H-1,4-benzodiazepin-2-one.
(39) 7-nitro-5-p-nitrophenyl-1,3-dihydro-2H-1,4-benzodiazepin-2-one.
(40) 7-trifluoromethyl-5-p-trifluoromethyl-1,3-dihydro-2H-1,4-benzodiazepin-2-one.
(41) 7-methyl-5-p-methyl-1,3-dihydro-2H-1,4-benzodiazepin-2-one.
(42) 7-ethyl-5-p-ethyl-1,3-dihydro-2H-1,4-benzodiazepin-2-one.

For further detailed explanation of the present invention, the following examples are given, wherein the term "part(s)" means "weight part(s)" unless otherwise noted, and the relation between "part(s)" and "part(s) by volume" corresponds to that between gram(s), and milliliter(s).

EXAMPLE 1

A mixture of 6 parts of 3-phenyl-5-chloroanthranyl, 17 parts of glycine ethylester hydrochloride and 20 parts of 2-methylimidazole is fused by heating at a temperature of 120 to 130° C. for 11 hours. To the resultant is added 7 parts of glycine ethylester hydrochloride and this mixture is fused at the same temperature range as above for 2 hours. After cooling, the resulting product is admixed thoroughly with 500 parts by volume each of water and ethyl acetate. The ethyl acetate layer is recovered, washed with 100 parts of water and dried over anhydrous magnesium sulfate. Thus treated solution is decolorized with active carbon and concentrated under reduced pressure, whereby yellow oily substance is produced. The substance is treated with 200 parts by volume of ligroin. The ligroin insoluble part is collected and admixed with a mixture of ethanol and petroleum ether, whereby colorless crystals of 7-chloro-5-phenyl-1,3-dihydro-2H-1,4-benzodiazepin-2-one is precipitated out. Melting point: 213° C. Yield 4.2 parts (60%).

EXAMPLE 2

A mixture of 1.15 part of 3-phenyl-5-chloroanthranyl, 3.8 parts of 2-methylimidazole, 3.5 parts of glycine ethylester hydrochloride and 0.63 part of acetic acid is fused by heating at 120° C. to 130° C. for 12 hours. To the resultant is added 95 parts each of water and ethyl acetate, followed by stirring thoroughly. The ethyl acetate layer is recovered, washed with 20 parts of water, dried over magnesium sulfate, and decolorized with active carbon. Thus treated solution is distilled under reduced pressure to give yellow oily substance. The substance is treated as in Example 1 to give colorless crystals of 7-chloro-5-phenyl-1,3-dihydro-2H-1,4-benzodiazepin-2-one melting at 212° C. Yield: 0.82 part (60%).

EXAMPLE 3

A mixture of 7.2 parts of 3-phenyl-5-nitroanthranyl, 21 parts of glycine ethylester hydrochloride, 25 parts of 2-methylimidazole and 5 parts by volume of 99% formic acid is fused by heating at a temperature of 120° to 130° C. for 7 hours. To the mixture is added 8 parts of glycine ethylester hydrochloride and this mixture is fused at the same temperature as above for 2 hours. To the resultant is added 5 parts by volume of 99% formic acid and 16 parts of glycine ethylester hydrochloride, followed by fusing at the same temperature as above for 4 hours.

After cooling, the resulting substance is admixed thoroughly with 500 parts by volume each of water and ethyl acetate. The ethyl acetate layer is recovered, washed with water and dried over anhydrous magnesium sulfate.

Thus treated solution is decolorized with active carbon and concentrated under reduced pressure, whereby brownish oily substance is obtained. The substance is dissolved in a mixture of benzene and acetone (10:2 by volume) and this solution is passed through a column packed with silica gel. The eluate is collected and distilled under reduced pressure to evaporate the solvent. To the residue is added a mixture of ethanol and petroleum ether, whereby 7-nitro-5-phenyl-1,3-dihydro-2H-1,4-benzodiazepin-2-one is obtained as pale yellow crystals. Melting point: 223° C. Yield: 2.0 parts (24%).

EXAMPLE 4

A mixture of 4.6 parts of 3-phenyl-5-chloroanthranyl, 14 parts of glycine ethylester hydrochloride, 0.92 part by volume of 99% formic acid and 180 parts by volume of pyridine is subjected to a distillation until 160 parts by volume of pyridine is recovered. The residue is refluxed for 2 hours and distilled to evaporate pyridine. This residue is extracted with a mixture of 100 parts of water and 100 parts by volume of benzene. The aqueous layer is extracted with 30 parts by volume of benzene. The benzene extract is dried over anhydrous sodium sulfate and distilled to evaporate benzene, whereby yellowish brown oily substance is obtained. The oily substance is mixed thoroughly with 5 parts by volume of ethyl ether to give pale yellow crystals of 7-chloro-5-phenyl-1,3-dihydro-2H-1,4-benzodiazepin-2-one. Melting point: 210–213° C. Yield: 3.2 parts (59%).

EXAMPLE 5

A mixture of 2.3 parts of 3-phenyl-5-chloroanthranyl, 8.2 parts of 2-methylimidazole, 1.5 parts by volume of 99% formic acid and 7.0 parts of glycine ethylester hydrochloride is fused by heating at a temperature of 125° to 130° C. for 7 hours. To the resultant is further added 2.8 parts of glycine ethylester hydrochloride and the mixture is heated at the same temperature as above for 1.5 hours. After cooling, the resulting substance is extracted with a mixture of 120 parts of water and 300 parts by volume of ethyl acetate. The ethyl acetate layer is recovered, washed with 100 parts of water, and dried over anhydrous magnesium sulfate. Thus treated ethyl acetate solution is distilled to evaporate the solvent to give oily brown viscous residue. To the residue is added 10 parts by volume of ethanol and insolubles are removed. The ethanol solution is distilled to evaporate ethanol. The resulting residue is treated with 100 parts by volume of ligroin. The ligroin insoluble part is collected and admixed with 3 parts by volume of ethanol, followed by cooling.

This procedure gives pale yellow crystals of 7-chloro-5-phenyl-1,3-dihydro-2H-1,4-benzodiazepin-2-one. Melting point: 213° C. Yield: 1.2 part (44%).

EXAMPLE 6

A mixture of 4 parts of 3-phenylanthranyl, 14 parts of glycine ethylester hydrochloride, 2 parts by volume of 99% formic acid and 16 parts of 2-methylimidazole is fused by heating at a temperature of 120 to 130° C. for 4 hours. To the resultant is added 6 parts of glycine ethylester hydrochloride and the mixture is fused at the same temperature as above for 7 hours. After cooling the resulting substance is admixed thoroughly with a mixture of 500 parts by volume of ethyl acetate and 500 parts of water. The ethyl acetate layer is recovered, washed with 100 parts of water and dried over anhydrous magnesium sulfate. The ethyl acetate solution is decolorized with active carbon and distilled under reduced pressure to evaporate the solvent, whereby pale yellow oily substance is obtained. The oily substance is dissolved in a mixture of benzene and acetone (10:1 by volume) and the solution is passed through a column packed with silica gel. The colorless eluate is collected and distilled under reduced pressure, whereby 1,3-dihydro-5-phenyl-2H-1,4-benzodiazepin-2-one is obtained as colorless prisms. Melting point: 180 to 181° C. Yield: 3.3 parts (68%).

What we claimed is:

1. A process for producing a benzodiazepine compound of the formula

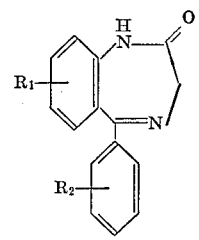

wherein $R_1$ is hydrogen, halogen or nitro and $R_2$ is hydrogen, halogen or nitro and $R_2$ is hydrogen, halogen or nitro, which comprises reacting an anthranyl compound of the formula

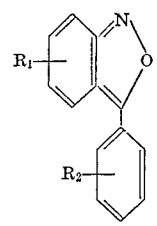

wherein $R_1$ and $R_2$ have the meanings above, with an acid salt of glycine ester in the presence of an organic base under heating to at least about 100° C.

2. A process for producing a benzodiazepine compound of the formula

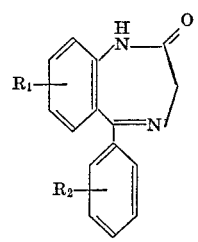

wherein $R_1$ is hydrogen, halogen or nitro and $R_2$ is hydrogen, halogen or nitro and $R_2$ is hydrogen, halogen or nitro, which comprises reacting an anthranyl compound of the formula

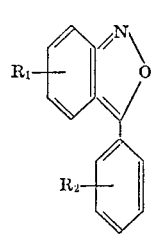

wherein $R_1$ and $R_2$ have the meanings above, with an acid salt of glycine ester under heating at 100° to 150° C. in the presence of an organic base in an amount of 1 to 10 moles per mole of anthranyl compound.

3. The process as claimed in claim 1, wherein the acid salt of glycine ester is a glycine ester hydrochloride.

4. The process as claimed in claim 1, wherein the organic base is pyridine.

5. The process as claimed in claim 1, wherein the organic base is 2-methylimidazole.

6. The process as claimed in claim 1, wherein the base is employed in an amount of 4 to 6 moles relative to one mole of the anthranyl compound.

References Cited

UNITED STATES PATENTS 3,261,870 7/1966 Rachlin _____ 260—239.3
3,352,877 11/1967 Den Hollander _____ 260—239

HENRY R. JILES, Primary Examiner
R. T. BOND, Assistant Examiner

U.S. Cl. X.R.
260—999